United States Patent [19]
Stine et al.

[11] Patent Number: 5,242,475
[45] Date of Patent: Sep. 7, 1993

[54] OIL SEPARATOR AND CONE INLET DIFFUSER

[75] Inventors: Robert L. Stine; Janet L. Stine, both of Red Lion; Keith E. Starner, York, all of Pa.

[73] Assignee: York International Corporation, York, Pa.

[21] Appl. No.: 872,155

[22] Filed: Apr. 22, 1992

[51] Int. Cl.$^5$ .................. B01D 19/00; B01D 46/12
[52] U.S. Cl. ......................... 55/319; 55/323; 55/332; 55/418; 55/462; 55/DIG. 25
[58] Field of Search .............. 55/307, 319, 320, 323, 55/332, 418, 434, 462, DIG. 25

[56] References Cited

U.S. PATENT DOCUMENTS

| | | | |
|---|---|---|---|
| 1,326,686 | 12/1919 | Orr . | |
| 2,074,323 | 3/1937 | Borgerd | 230/202 |
| 2,835,340 | 5/1958 | McGuff et al. | 55/418 X |
| 2,964,926 | 12/1960 | Ware | 62/471 |
| 3,197,946 | 8/1965 | Taylor | 55/418 X |
| 3,283,532 | 11/1966 | Kocher | 62/473 |
| 3,563,053 | 2/1971 | Bottum | 62/503 |
| 3,570,221 | 3/1971 | Oliver | 55/418 |
| 3,713,279 | 1/1973 | Moore | 55/319 |
| 3,749,130 | 7/1973 | Howitt et al. | 55/418 X |
| 3,811,251 | 5/1974 | Gibel | 55/319 X |
| 3,923,480 | 12/1975 | Visch | 55/DIG. 25 |
| 4,297,116 | 10/1981 | Cusick | 55/319 |
| 4,359,329 | 11/1982 | Willeitner | 55/320 X |
| 4,472,949 | 9/1984 | Fujisawa et al. | 62/473 |
| 4,622,048 | 11/1986 | Roberts et al. | 55/199 |
| 4,769,050 | 9/1988 | Shaw et al. | 55/319 X |
| 4,906,264 | 3/1990 | Szymaszek et al. | 55/324 |
| 5,030,261 | 7/1991 | Giusti et al. | 55/418 X |

FOREIGN PATENT DOCUMENTS

| | | | |
|---|---|---|---|
| 0225343 | 7/1985 | German Democratic Rep. | 55/320 |
| 0225344 | 7/1985 | German Democratic Rep. | 55/320 |
| 0266140 | 3/1989 | German Democratic Rep. | 55/332 |
| 0952292 | 8/1982 | U.S.S.R. | 55/320 |

Primary Examiner—Robert Spitzer
Attorney, Agent, or Firm—Finnegan, Henderson, Farabow, Garrett and Dunner

[57] ABSTRACT

Oil separator assembly for removing and collecting oil entrained in a gas includes a vessel having a cavity with a reservoir formed therein; an inlet pipe extending into the vessel; an inlet diffuser securely attached to the inlet pipe for initially separating the entrained oil from the refrigerant gas; and independent oil and gas outlet ports extending from the vessel for emitting the separated oil and ejecting the substantially oil-free refrigerant gas, respectively. The inlet diffuser includes a conical-shaped hollow member having an open base, a closed end, and a converging side wall extending from the open base to the closed end. Refrigerant gas and entrained oil, received through the open base, gradually impacts on the inner surface of the side wall in a manner sufficient to promote coalescence of the oil. The coalesced oil is directed across the inner surface of the side wall transversely away from the refrigerant gas.

19 Claims, 4 Drawing Sheets

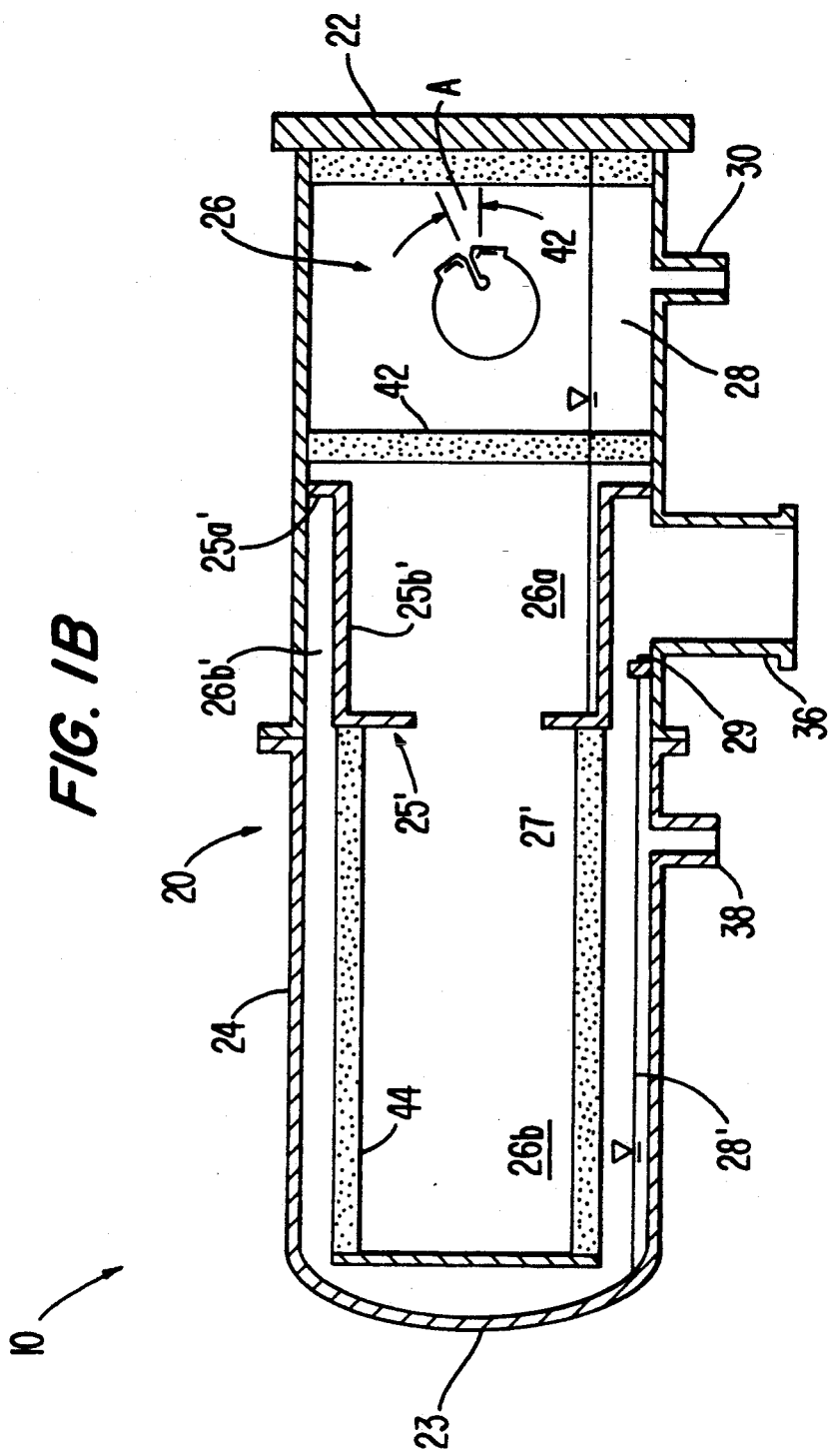

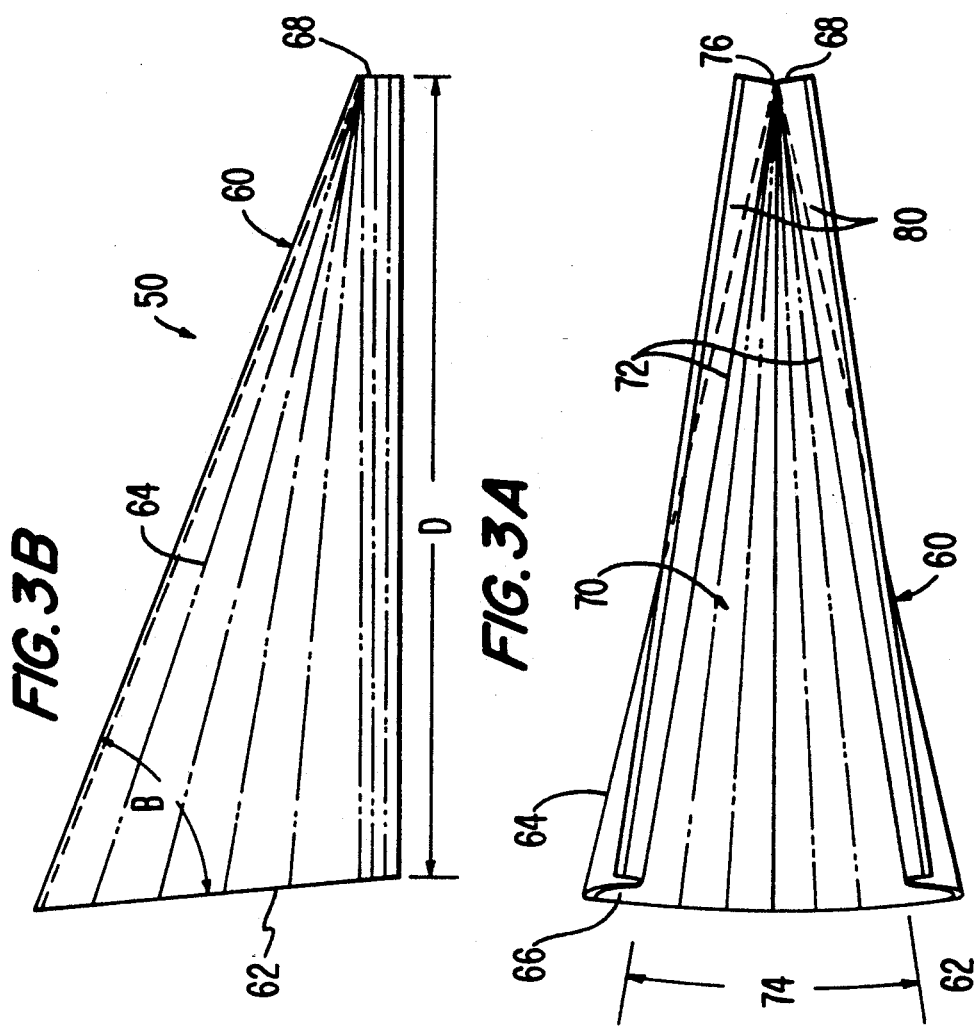
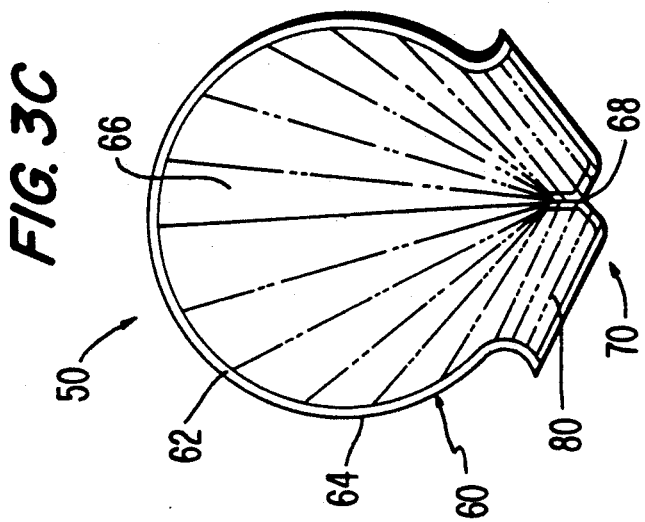

OIL SEPARATOR AND CONE INLET DIFFUSER

BACKGROUND OF THE INVENTION

1. Field of the Invention

The present invention relates to an inlet diffuser for an oil separator assembly. In particular, the present invention is directed to a cone inlet diffuser capable of removing oil entrained in a compressed refrigerant gas as the gas and entrained oil pass through the inlet diffuser.

2. Description of the Prior Art

Refrigeration and liquid chilling systems typically operate under a closed loop design, such that refrigerant is continuously recirculated through the liquid chilling system. Generally, the components of a refrigeration or liquid chilling system include a compressor for compressing and circulating refrigerant gas, a condenser for cooling and condensing the compressed refrigerant gas into a refrigerant liquid, and an evaporator for absorbing surrounding heat and evaporating the refrigerant liquid into refrigerant gas for subsequent compression and recirculation.

To lubricate and seal the internal mechanisms of the compressor, oil is typically injected into the compressor with the refrigerant gas. In operation, some of the oil atomizes and becomes entrained in the compressed refrigerant gas. This entrainment of oil in the circulating refrigerant gas can prove detrimental to the chilling system for at least two reasons.

First, oil must constantly be available in the compressor to lubricate and seal the internal mechanisms and assist in cooling the refrigerant gas undergoing compression. Upon entrainment, however, the oil is typically displaced from the compressor as it circulates through the system with the refrigerant gas. The oil is then likely to become trapped in a system component located downstream from the compressor, such as the condenser or evaporator. Since a lubricant and sealant must be maintained in the compressor, either additional oil must be introduced into the compressor, which would inevitably lead to oversaturation of the refrigerant gas with oil, or return lines must be provided to remove the trapped oil from the downstream components and reintroduce it into the compressor.

Second, the entrainment of oil in the circulating refrigerant gas may severely impair both the operation of the chilling system and the efficiency of the refrigerant gas. As the refrigerant gas entrained with oil is circulated through the chilling system, the oil tends to coat the heat exchanging surfaces of the condenser and evaporator. This results in a loss in the thermal efficiency of these heat exchangers. Likewise, the entrainment of oil may also reduce the cooling characteristics of the refrigerant gas and liquid, itself.

Hence, it is imperative that such a liquid chilling system include an oil separator downstream from the compressor to remove and collect oil entrained in the circulating refrigerant gas and reintroduce the collected oil into the compressor. The need for oil separators in refrigeration and liquid chilling systems is well recognized, particularly with the advent of screw compressors. A significant quantity of oil is typically required to properly seal and lubricate the internal mechanisms of a screw compressor. Further, since screw compressors may have capacities in excess of 600 ton, the oil separator utilized in combination with a screw compressor must be extremely durable to withstand the forces associated with such a large operating capacity.

A variety of oil separator assemblies have been developed to separate oil from a flowing gas. Examples of previously designed systems are disclosed in U.S. Pat. Nos. 2,074,323 to Borgerd; No. 3,283,532 to Kocher; No. 3,563,053 to Bottum; No. 4,472,949 to Fujisawa et al.; No. 4,622,048 to Roberts et al.; and No. 4,906,264 to Szymaszek et al. These previous attempts to separate oil from a gaseous flow base included concentric funnel assemblies (Borgerd); a combination of filters and baffles (Kocher); and devices utilizing centrifugal force to achieve the separation (Bottum, Fujisawa et al., Roberts et al., and Szymaszek et al.). In the Applicants' view, each of these proposed oil separator assemblies present disadvantages. More specifically, the Applicants believe that in commercial application these proposed oil separator assemblies are not successful at separating oil from gas to the degree such separation is desired, particularly in the refrigeration field.

SUMMARY OF THE INVENTION

The general object of the invention is to provide an inlet diffuser which efficiently and economically separates liquid entrained in a gaseous flow as the gaseous flow and entrained liquid pass through the inlet diffuser.

A further object of the invention is to provide an oil separator assembly which is capable of removing and collecting oil entrained in a compressed refrigerant gas.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention includes an inlet diffuser for separating a liquid entrained in a gaseous flow as the gaseous flow and entrained liquid pass through the inlet diffuser. The inlet diffuser of the present invention generally comprises a hollow member having an open base for receiving the gaseous flow and entrained liquid, a closed end longitudinally spaced from the open base, and a converging side wall longitudinally-extending from the open base to the closed end. The hollow member is configured so that the gaseous flow and entrained liquid received through the open base gradually impact on an inner surface of the side wall in a manner sufficient to promote coalescence of the liquid thereon to effectively separate the liquid from the gaseous flow. Further, the side wall has a longitudinal slot formed therethrough for discharging the gaseous flow after the gaseous flow impacts on the inner surface of the side wall and the liquid is coalesced. The inlet diffuser also comprises means for directing the coalesced liquid transversely away from the gaseous flow to prevent re-entrainment of the coalesced liquid as the gaseous flow is discharged through the longitudinal slot.

As more specifically embodied in the preferred inlet diffuser of the present invention, the directing means includes outwardly contoured lip members respectively formed along opposing longitudinal edges of the longitudinal slot in smooth transition with the inner surface of the side wall to promote flow of the coalesced liquid from the inner surface of the side wall onto the outwardly contoured lip members and transversely away from the gaseous flow. The hollow member of the preferred embodiment of the inlet diffuser is substantially conical in shape with the side wall joining together to form the closed end.

As further embodied and broadly described herein, the invention includes an oil separator assembly for removing and collecting oil entrained in a gaseous flow. The oil separator of the present invention comprises a substantially enclosed vessel having a cavity formed therein; an inlet pipe extending into the vessel and communicating with the cavity for injecting the gaseous flow and entrained oil into the cavity; an inlet diffuser aligned with the inlet pipe for initially separating the entrained oil from the gaseous flow as the gaseous flow and entrained oil pass through the inlet diffuser; an oil outlet port communicating with the cavity and extending from the vessel for emitting the coalesced oil from the cavity; and a gas outlet port communicating with the cavity and extending from the vessel for exhausting the gaseous flow from the cavity substantially free of oil.

The inlet diffuser provided in the oil separator of the present invention includes a hollow member having an open base for receiving the gaseous flow and entrained oil, a closed end longitudinally spaced from the open base, and a converging side wall longitudinally-extending from the open base to the closed end. The hollow member is configured so that the gaseous flow and entrained oil received through the open base gradually impact on an inner surface of the side wall in a manner sufficient to promote coalescence of the oil thereon to effectively separate the oil from the gaseous flow. Further, the side wall has a longitudinal slot formed therethrough for discharging the gaseous flow after the gaseous flow impacts on the inner surface of the side wall and the oil is coalesced; and means for directing the coalesced oil transversely away from the gaseous flow to prevent re-entrainment of the coalesced oil as the gaseous flow is discharged through the longitudinal slot.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

BRIEF DESCRIPTION OF THE DRAWINGS

FIG. 1B is a schematic cross-sectional side view of an alternative representative embodiment of the oil separator assembly of the present invention.

FIG. 3A is a front view of a representative embodiment of the cone inlet diffuser of the present invention.

FIG. 3B is a side view of the cone inlet diffuser of FIG. 3A.

FIG. 3C is a bottom view of the cone inlet diffuser of FIG. 3A.

DESCRIPTION OF PREFERRED EMBODIMENTS

Reference will now be made in detail to the present preferred embodiment of the invention, an example of which is illustrated in the accompanying drawings. Wherever possible, the same reference numbers will be used throughout the drawings to refer to the same or like parts.

The function of an oil separator assembly is to remove and collect liquid entrained in gaseous flow. In its broadest sense, and in accordance with the present invention, the oil separator assembly of the present invention receives a mixture of gaseous flow and entrained liquid through an inlet and subsequently exhausts the gaseous flow, substantially free of the liquid, through one outlet while emitting the separated liquid through a second outlet. Typically, the gaseous flow injected into the oil separator assembly of the present invention consists of, but is certainly not limited to, a refrigerant gas. Likewise, the liquid entrained in the gaseous flow is anticipated to consist of oil, although a variety of other liquids are possible.

Figure 1A:
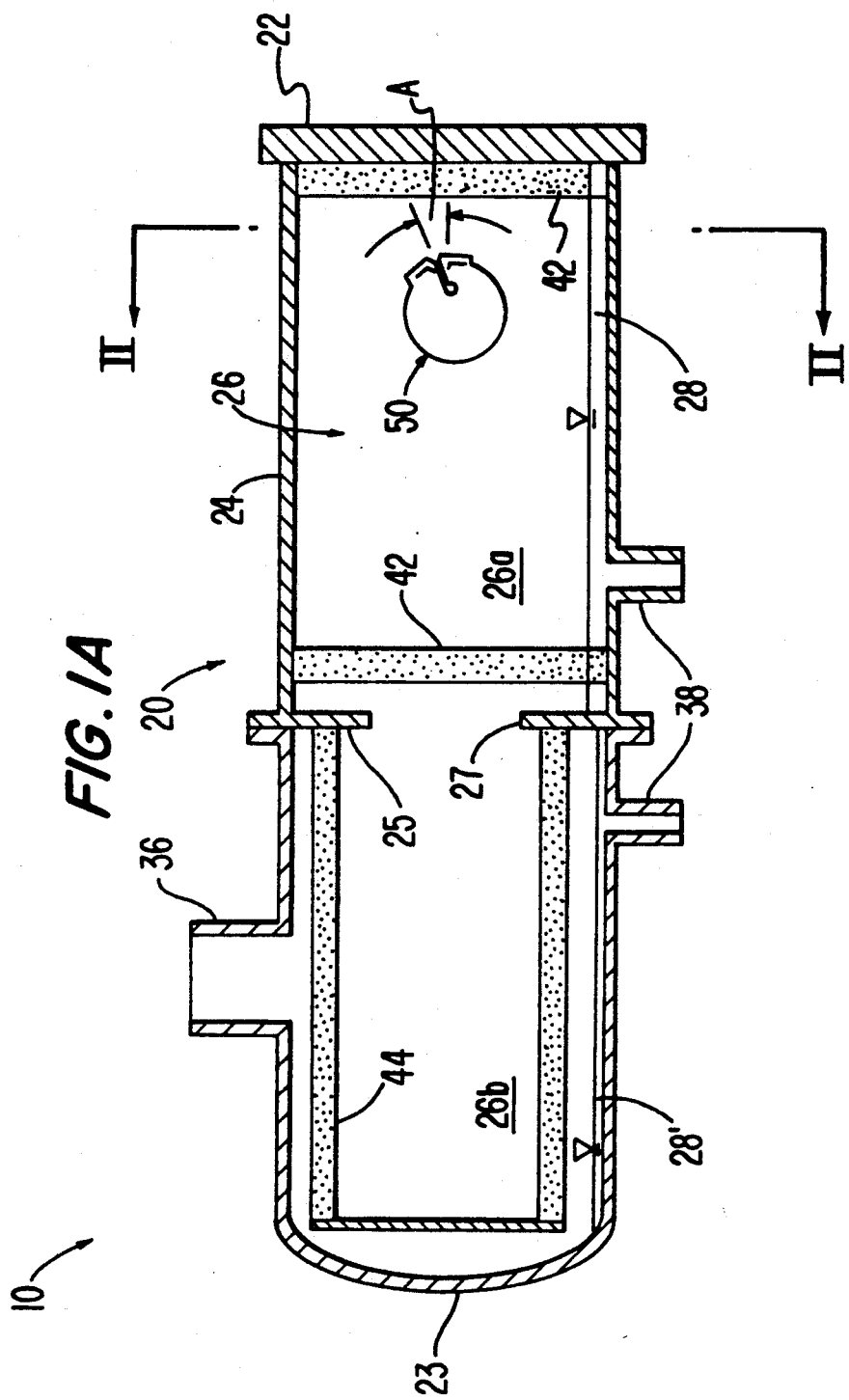
FIG. 1A is a schematic cross-sectional side view of a representative embodiment of the oil separator assembly of the present invention.
Figure 2:
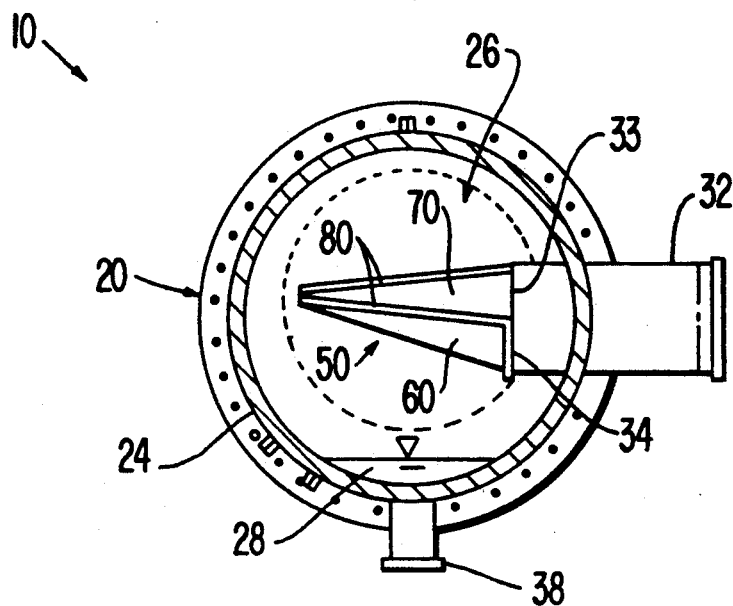
FIG. 2 is a cross-sectional end view of the oil separator assembly taken along line II—II of FIG. 1A.

The oil separator assembly embodied herein is substantially comprised of an enclosed vessel having a cavity formed therein. The overall shape and construction of the vessel is obviously dependent upon the capacity of the chilling system for which it is intended, as well as additional miscellaneous factors such as available space. With initial reference to FIGS. 1A, 1B and 2, the oil separator assembly, as generally designated by reference character 10, includes two end members 22,23, and a tubular wall member 24 extending between and connecting the two end members 22,23. In this manner, the vessel 20 is defined by the two end members 22,23 and the tubular wall member 24, while the cavity 26 is generally defined by the space substantially enclosed therein. While FIGS. 1A, 1B and 2 show the tubular wall member 24 as being circular in cross-section, it should be understood that alternative cross-sections may be used if desired. Further, it is evident from FIGS. 1A, 1B and 2 that the two end members 22,23 need not be identical in shape, nor need they both be planar. As will be discussed below, however, it is preferred that the two end members 22,23 are aligned generally-vertical, with the tubular will member 24 extending horizontally between them.

Also included in the oil separator assembly is an inlet pipe extending into the vessel and communicating with the cavity, and at least two independent outlet ports communicating with the cavity and extending from the vessel. As seen in FIG. 2, the inlet pipe 32 preferably extends through the tubular wall member 24 of the vessel 20 in a substantially horizontal orientation. In operation, a mixture of refrigerant gas and entrained oil is injected into the cavity 26 through inlet pipe 32. After passing through various means for separating the oil, which will be discussed in greater detail below, the substantially oil-free refrigerant gas is exhausted from the oil separator assembly 10 through gas outlet port 36. Similarly, the oil separated from the refrigerant gas is emitted from the oil separator assembly 10 through oil outlet ports 38. In this manner, the separated oil can be reintroduced into the compressor for sealing and lubricating the internal mechanisms thereof, and the substantially oil-free refrigerant gas can be circulated through system piping without clogging the piping with accumulations of oil.

While several methods of separating entrained oil from a refrigerant are available, the oil separator assembly of the present invention exploits the inherent hydrostatic characteristics of the entrained oil to facilitate separation. Since the mixture of refrigerant gas and entrained oil are typically injected into the oil separator assembly at a flow velocity of substantial magnitude, the present invention is designed to utilize this flow velocity, as well as the surface tension and specific gravity of the entrained oil, to separate the entrained oil from the refrigerant gas. More specifically, and in accordance with the present invention, the oil separator assembly includes an inlet diffuser for separating oil entrained in the refrigerant gas as the mixture of refrigerant gas and entrained oil pass therethrough.

As seen in FIGS. 1A, 1B and 2, the inlet diffuser is aligned with the discharge end of the oil separator assembly inlet pipe for initial separation of entrained oil from refrigerant gas. In the preferred embodiments shown in the drawings, the inlet diffuser 50 is secured directly to the inlet pipe 32 by attaching means 34. Alternatively, the diffuser could be secured to the inlet pipe 32, or even the vessel 20, in a different manner. Of course it should be evident from the following discussion that the inlet diffuser is not limited to use with the oil separator of the present invention, nor is it limited to separating oil from refrigerant gas. Rather, the inlet diffuser may be utilized to separate substantially any liquid entrained in a gaseous or liquid flow, so long as the entrained liquid is of sufficient specific gravity and surface tension relative the gaseous or liquid flow to permit coalescence.

Generally, the inlet diffuser made in accordance with the present invention is designed to receive a mixture of gaseous flow and entrained liquid, separate the entrained liquid from the gaseous flow through coalescence of the liquid, and then discharge the gaseous flow while directing the coalesced liquid transversely away from the direction of the gaseous flow discharge to prevent re-entrainment of the liquid into the gaseous flow.

FIGS. 3A through 3C present three views of an embodiment of the inlet diffuser of the present invention, generally designated by reference character 50. As embodied herein, the inlet diffuser of the present invention includes a hollow member 60 having an open base 62 for receiving the gaseous flow and entrained liquid, a closed end 68 longitudinally spaced from the open base 62, and a converging side wall 64 longitudinally-extending from the open base 62 to the closed end 68. The open base 62 of the inlet diffuser is adapted to be securely attached to the inlet pipe of an oil separator assembly.

In the preferred embodiment of the inlet diffuser, as seen in FIGS. 3A through 3C, the converging side wall 64 joins together at a longitudinal distance D from the open base 62 to form the closed end 68. Since inlet pipes are generally circular in cross-section, it is preferable to form the hollow member 60 substantially conical in shape with the open base 62 being substantially circular in cross-section and the closed end 68 forming the apex of the conical shape. Of course, if inlet pipes of alternate cross-sections are anticipated, the inlet diffuser of the present invention can be shaped accordingly. Further, while it is preferable to weld the open base 62 to the discharge end of an inlet pipe, alternative means for secure attachment may be utilized, i.e., providing the open base with a peripheral flange having spaced apertures suitable for threaded fasteners or the like.

To facilitate separation of the entrained liquid, the hollow member 60 is configured so that the gaseous flow and entrained liquid received through the open base 62 gradually impact on an inner surface 66 of the side wall 64 in a manner sufficient to promote coalescence of the liquid thereon. In the present invention, gradual impacting is provided by angling the side wall 64 relative the open base 62 to slightly interrupt and redirect the flow stream of the gaseous flow and the entrained liquid. This angle B is best seen in FIG. 3B.

Coalescence occurs at impacting due to the specific gravity and surface tension of the liquid, and, in essence, results in the effective separation of the liquid from the gaseous flow. It is important to note, however, that if the side wall 64 is angled too sharply relative the open base 62, any liquid which coalesces subsequently will be re-entrained due to the excessive forces created by the gaseous flow directly impacting the inner surface 66 of the side wall 64. Conversely, if the angle B of the side wall 64 is too gradual, the impacting forces incurred by the gaseous flow and entrained liquid may be insufficient to induce coalescence. As such, the converging side wall 64 must be properly angled relative the open base 62 to ensure the gaseous flow and entrained liquid gradually impact on the inner surface with sufficient force to induce coalescence. Preferably, the angle B formed between the side wall 64 and the open base 62 is between about 62° and 68°, as seen in FIG. 3B.

As further seen in FIGS. 3A through 3C, and embodied herein, the side wall 64 of the inlet diffuser 50 of the present invention includes a longitudinal slot 70 formed therethrough. After the gaseous flow impacts on the inner surface 66 of the side wall 64 and the liquid is coalesced thereon, as discussed above, the gaseous flow is discharged through the longitudinal slot 70. It is noted in FIG. 4 that the gaseous flow G is initially received by the open base 62 such that the flow stream of the gaseous flow G is substantially aligned with the longitudinal axis of the inlet diffuser 50. Due to the impacting of the gaseous flow G on the inner surface 66 of the side wall 64, the flow stream of the gaseous flow G is urged substantially toward the radial direction of the inlet diffuser 50. Accordingly, the longitudinal slot 70 is positioned in the side wall 64 of the hollow member 60 to permit the gaseous flow G to discharge radially from the inlet diffuser 50.

Figure 4:
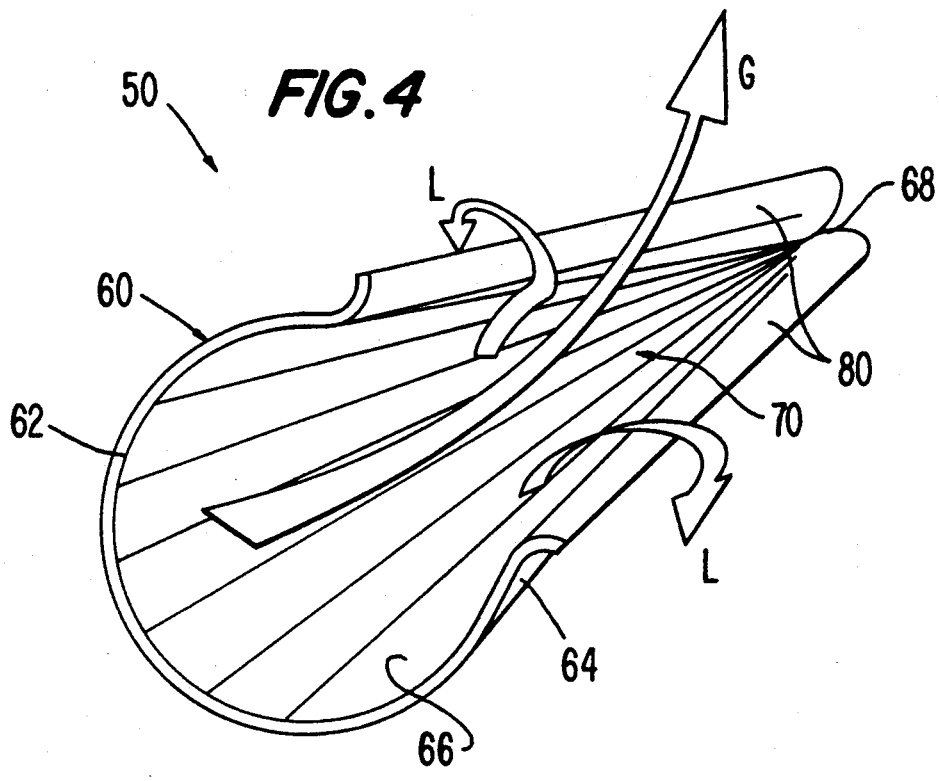
FIG. 4 is an orthogonal view from the open base of the cone inlet diffuser of FIG. 3A showing the respective flow streams of the gaseous flow and coalesced liquid through the inlet diffuser.

The longitudinal slot 70 included in the side wall 64 may be formed in a variety of shapes, depending upon the configuration of the inlet diffuser 50. In the preferred embodiment of the present invention, the longitudinal slot 70 has a substantially triangular shape with a base 74 and an apex 76. As seen in FIGS. 3A and 4, the base 74 of the triangular-shaped longitudinal slot 70 is positioned proximate the open base 62 of the hollow member 60 and the apex 76 of the triangular-shaped longitudinal slot 70 is positioned proximate the closed end 68. While FIGS. 3A and 4 show the open base 62 and longitudinal slot 70 being formed substantially as a single opening, it should be understood that the two openings 62,70 need not be connected. That is, it is likewise anticipated that the longitudinal slot 70 may be formed in the side wall 64 without extending the full length of the hollow member 60, such that a peripheral portion of the side wall 64 separates the open base 62 from the longitudinal slot 70.

As the gaseous flow passes through the inlet diffuser of the present invention, initially entrained liquid is coalesced for separation of the liquid from the gaseous flow. In accordance with the invention, and as embodied herein, the inlet diffuser further includes means for directing the coalesced liquid transversely away from the gaseous flow to prevent re-entrainment of the coalesced liquid as the gaseous flow is discharged from the inlet diffuser.

The directing means embodied in the present invention, and shown in FIGS. 3A through 3C, include outwardly contoured lip members 80 respectively formed along opposing longitudinal edges 72 of the longitudinal slot 70. The outwardly contoured lip members 80 are formed in smooth transition with the inner surface 66 of the side wall 64. As best seen in FIG. 4, this smooth transition permits the coalesced liquid L to move easily from the inner surface 66 of the side wall 64 onto and across the outwardly contoured lip members 80.

In operation, and as mentioned above, the liquid L initially entrained in the gaseous flow G coalesces on the inner surface 66 of the side wall 64. As coalescence continues, the liquid L forms into larger droplets. The forces created by the gaseous flow G impacting on the droplets of coalesced liquid L pushes or urges the coalesced liquid L outwardly across the inner surface 66 of the hollow member 60, as seen in FIG. 4. Due to Surface tension, the coalesced liquid L clings to the inner surface 66 as it is urged or pushed by the gaseous flow G. Upon reaching the longitudinal edge 72 of the longitudinal slot 70, and as demonstrated in FIG. 4, the coalesced liquid L is then urged by the gaseous flow G over the smooth transition and onto the outwardly contoured lip members 80. Again due to surface tension, the coalesced liquid L continues to cling to the outwardly contoured lip members 80 as it moves transversely away from the gaseous flow G. Once the coalesced liquid L has moved over the outwardly Contoured lip members 80 beyond the discharge of the gaseous flow G, gravity acts upon the droplets of coalesced liquid L to remove and collect the coalesced liquid L from the inlet diffuser 50, as will be discussed below.

With the operation of the inlet diffuser performed as set forth above and presented in FIG. 4, it should be evident that the coalesced liquid is effectively directed transversely away from the gaseous flow. As such, the potential for the gaseous flow to carry the coalesced liquid further downstream after discharge from the inlet diffuser is greatly reduced. That is, by directing the coalesced oil transversely away from the gaseous flow, the inlet diffuser of the present invention prevents re-entrainment of the coalesced liquid into the gaseous flow.

A variety of methods for fabricating the inlet diffuser 50 embodied herein are anticipated. Due to its relatively simple design, the inlet diffuser 50 is preferably formed from sheet metal of sufficient thickness and rigidity to withstand the excessive flow forces associated with screw compressors. Alternatively, the inlet diffuser of the present invention may be cast, or even press formed, if sufficiently durable construction is possible. In this manner, a conical inlet diffuser of the present invention may readily be manufactured to facilitate between 390 and 650 ton capacity.

The inlet diffuser 50 will be further clarified by the following example, which is intended to be purely exemplary of the invention. Any reasonable combination of dimensions may be used in the design of the inlet diffuser 50 of the present invention. One such inlet diffuser configuration intended for use in a liquid chilling system having a screw compressor with a 390 ton capacity and an oil separator having an inlet pipe with an outer diameter of $6\frac{5}{8}$ inches is as follows. Referring to FIGS. 3A through 3C, the outer diameter of the open base 62 is about $6\frac{1}{2}$ inches; the base 74 of the triangular-shaped longitudinal slot 70 is about 4 inches; the longitudinal distance D between the open base 62 and the closed end 68 is about $13\frac{1}{4}$ inches; and the angle B between the open base 62 and the side wall 64 is about 65°. The inlet diffuser of this example is fabricated from $\frac{1}{8}$ inch thick hot rolled steel. Two symmetrical halves are contoured by a series of press breaks to integrally form the conical-shaped hollow member and outwardly contoured lip members, and then secured together by a full penetrating weld.

As previously mentioned, the inlet diffuser discussed in detail above is incorporated into the oil separator assembly of the present invention for initially separating the entrained oil from the refrigerant gas. Referring to FIGS. 1A, 1B and 2, it is evident that an attaching means 34, i.e., welding, securely aligns the inlet diffuser 50 of the present invention with the discharge end 33 of the inlet pipe 32. As the mixture of refrigerant gas and entrained oil is first injected into the cavity 26 of the vessel 20, the mixture is initially forced through the inlet diffuser 50.

The entrained oil which is coalesced and directed transversely away from the refrigerant gas subsequently drips off the inlet diffuser 50 due to gravity, as mentioned above. Preferably, the oil separator assembly 10 includes a reservoir 28 positioned in the cavity 26 below the inlet diffuser 50 for catching and collecting the coalesced oil as it drips from the inlet diffuser 50. As seen in FIGS. 1A, 1B and 2, the reservoir 28 is in fact an integral portion of the cavity 26; although, the reservoir may be formed as a separate tank within the cavity, if desired. The oil outlet port 38 fluidly communicates with the reservoir 28 for emitting the collected coalesced oil from the reservoir 28. The oil emitted from the reservoir 28 through the oil outlet port 38 may then be recirculated into the compressor to act as a sealant and lubricant.

In addition to directing the coalesced oil away from the refrigerant gas to prevent re-entrainment, it is also preferable for the refrigerant gas to be discharged from inlet diffuser in a direction away from the reservoir of collected oil. It has been observed that the interaction of refrigerant gas, or similar gaseous flow, with a quantity of oil tends to aerate the oil into a foamy consistency. Foaming of the oil collected in the reservoir 28 of the present invention could prove detrimental, as the foaming of oil might lead to re-entrainment of oil in the gas flow.

To avoid aeration of the oil, and as seen in the preferred embodiments of FIGS. 1A, 1B and 2, the inlet diffuser 50 is securely attached to the inlet pipe 32 with the longitudinal slot 70 positioned for discharging the gaseous flow substantially toward the generally-vertical end member 22. More specifically, the longitudinal slot 70 is positioned for discharging the gaseous flow substantially toward the generally-vertical end member 22 at an angle A above the horizontal between about 20° and 25°, as best seen in FIGS. 1A and 1B. In this manner, the refrigerant flow is discharged so as to impinge against the generally-vertical end member 22 and then circulate upwardly over the inlet diffuser 50 and toward the other generally-vertical end member 23, thus avoiding interaction with the oil collected in the reservoir 28.

While additional means for separating oil still entrained in the refrigerant gas are not essential to the practice of the present invention, such secondary separating means are presented in the preferred embodiments of FIGS. 1A, 1B and 2. For example, and as best seen in FIGS. 1A and 1B, a coalescing member 42 is positioned between the longitudinal slot 70 of the inlet diffuser 50 and the generally-vertical end member 22. The refrigerant gas is discharged from the inlet diffuser 50 so as to pass upwardly through the coalescing member 42 and circulate over the inlet diffuser 50 toward the generally-vertical end member 23. In essence, the coalescing member 42 is a mesh pad designed to collect or entrap oil as a mixture of gas and entrained oil passes therethrough. Preferably, the coalescing member is fabricated from stainless steel, or the like. A second similar coalescing member 42, or mesh pad, is positioned approximately midway through the oil separator 10 to further separate entrained oil, as seen in FIGS. 1A and 1B. Oil collected in these coalescing members 42 drains down into the reservoir 28, and is emitted through the oil outlet port 38 along with the coalesced oil initially separated by the inlet diffuser 50.

An additional secondary separating means may be provided by configuring the cavity 26 to include a first chamber and a second chamber by positioning a dividing wall within the cavity. As seen in FIG. 1A, a substantially planar dividing wall 25 may be utilized to form the first chamber 26a and the second chamber 26b, wherein the dividing wall 25 includes a through port 27 for fluidly connecting the first and second chambers 26a,26b. With the inlet pipe 32 extending through the tubular wall 24 into the first chamber 26a and the gas outlet port 36 fluidly communicating with and extending from the second chamber 26b, the refrigerant gas injected into the vessel 24 by the inlet pipe 32 must pass from the first chamber 26a to the second chamber 26b before being exhausted by the gas outlet port 36. As such, a coalescer element 44 is positioned proximate the through port 27 for separating any additional oil still entrained in the refrigerant as the refrigerant gas passes from the first chamber 26a to the second chamber 26b. The coalescer element 44 is cylindrical in shape and acts as a filter such that any remaining oil entrained in the refrigerant gas becomes entrapped in the fibers of the coalescer element 44. Preferably, the coalescer element 44 is fabricated from fiberglass, or the like. As with the coalescing members 42, oil collected by the coalescer element 44 drains into a reservoir 28', and is emitted through an oil outlet port 38 fluidly communicating with the reservoir 28'.

After passing through the secondary oil separating means, the refrigerant gas is then exhausted from the cavity of the vessel through the gas outlet port 36, substantially free of oil, for circulation through a refrigeration or liquid chilling system. Although FIG. 1A shows the gas outlet port 36 extending from the top of the vessel 20, it should be understood that the gas outlet port 36 of this embodiment may likewise be located so as to extend from a side thereof. However, in this embodiment of the oil separator, it is preferable that the gas outlet port 36 not be positioned below the coalescer element 44 to prevent re-entrainment of oil in the gas as in the gas is exhausted from the cavity 26.

FIG. 1B shows as alternative embodiment of the oil separator of the present invention, wherein the additional secondary separating means is configured such that the gas outlet port may extend from the bottom of the vessel. The additional secondary separating means of FIG. 1B operates in substantially the same manner as that of FIG. 1A discussed above. However, rather than utilizing a substantially planar dividing wall, as presented in FIG. 1A, the oil separator of FIG. 1B utilizes an extended dividing wall 25' to form the first and second chambers 26a,26b.

As seen in FIG. 1B, the extended dividing wall 25' includes a radial portion 25a' attached to the tubular wall 24, an axial portion 25b' extending longitudinally along a length of the vessel 20, and a through port portion 27' opposite the radial portion 25a'. In this manner, the extended dividing wall 25' forms an annular space 26b' within the second chamber 26b between the tubular wall 24 and the axial portion 25b'. The coalescer element 44 is attached to the dividing wall 25' proximate the through port portion 27', such that refrigerant gas passing through the coalescer element 44 must then pass through the annular space 26b' prior to being exhausted through the gas outlet port 36. An oil dam 29 is included to form a reservoir 28' below the coalescer element 44 and prevent collected oil from inadvertently leaking out the gas outlet port 36. As such, the gas outlet port 36 may be located so as to extend from the bottom of the vessel 20, if so desired.

It will be apparent to those skilled in the art that various modifications and variations can be made in the oil separator assembly and inlet diffuser of the present invention and in construction of these apparatus without departing from the scope or spirit of the invention.

Other embodiments of the invention will be apparent to those skilled in the ar from consideration of the specification and practice of the invention disclosed herein. It is intended that the specification and examples be considered as exemplary only, with a true scope and spirit of the invention being indicated by the following claims.

What is claimed is:

1. An inlet diffuser for separating a liquid entrained in a gaseous flow as the gaseous flow and entrained liquid pass through the inlet diffuser, the inlet diffuser comprising:

a hollow member having an open base for receiving the gaseous flow and entrained liquid, a closed end longitudinally spaced from the open base, and a converging side wall longitudinally-extending from the open base to the closed end, said hollow member being configured so that the gaseous flow and entrained liquid received through the open base gradually impact on an inner surface of the side wall in a manner sufficient to promote coalescence of the liquid thereon to effectively separate the liquid from the gaseous flow;

the side wall having a longitudinal slot formed therethrough for discharging the gaseous flow after the gaseous flow impacts on the inner surface of the side wall and the liquid is coalesced; and means for directing the coalesced liquid transversely away from the gaseous flow to prevent re-entrainment of the coalesced liquid as the gaseous flow is discharged through the longitudinal slot, the directing means including outwardly contoured lip members respectively formed along opposing longitudinal edges of the longitudinal slot in smooth transition with the inner surface of the side wall to promote flow of the coalesced liquid from the inner surface of the side wall onto the outwardly contoured lip members and transversely away from the gaseous flow.

2. The inlet diffuser of claim 1, wherein the open base is adapted to be securely attached to an oil separator assembly.

3. The inlet diffuser of claim 1, wherein the side wall of said hollow member proximate the closed end joins together to form the closed end.

4. The inlet diffuser of claim 1, wherein said hollow member is substantially conical in shape.

5. The inlet diffuser of claim 4, wherein the side wall is angled relative the open base between about 62° and 68°.

6. The inlet diffuser of claim 4, wherein the longitudinal slot has a substantially triangular shape with a base and an apex, the base of the triangular-shaped longitudinal slot being positioned proximate the open base of said hollow member and the apex of the triangular-shaped longitudinal slot being positioned proximate the closed end of said hollow member.

7. An oil separator assembly for removing and collecting oil entrained in a gaseous flow, the oil separator comprising:
  a substantially enclosed vessel having a cavity formed therein;
  an inlet pipe for extending into the vessel and communicating with the cavity for injecting the gaseous flow and entrained oil into the cavity;
  an inlet diffuser aligned with the inlet pipe for initially separating the entrained oil from the gaseous flow as the gaseous flow and entrained oil pass through the inlet diffuser, the inlet diffuser including
    a hollow member having an open base for receiving the gaseous flow and entrained oil, a closed end longitudinally spaced from the open base, and a converging side wall longitudinally-extending from the open base to the closed end, said hollow member being configured so that the gaseous flow and entrained oil received through the open base gradually impact on an inner surface of the side wall in a manner sufficient to promote coalescence of the oil thereon to effectively separate the oil from the gaseous flow,
    the side wall having a longitudinal slot formed therethrough for discharging the gaseous flow after the gaseous flow impacts on the inner surface of the side wall and the oil is coalesced, and
    means for directing the coalesced oil transversely away from the gaseous flow to prevent re-entrainment of the coalesced oil as the gaseous flow is discharged through the longitudinal slot, the directing means including outwardly contoured lip members respectively formed along opposing longitudinal edges of the longitudinal slot in smooth transition with the inner surface of the side wall to permit the coalesced oil to move from the inner surface of the side wall onto the outwardly contoured lip members transversely away from the gaseous flow;
  an oil outlet port communicating with the cavity and extending from the vessel for emitting the coalesced oil from the cavity; and
  a gas outlet port communicating with the cavity and extending from the vessel for exhausting the gaseous flow from the cavity substantially free of oil.

8. The oil separator assembly of claim 7, wherein said hollow member is substantially conical in shape.

9. The oil separator assembly of claim 8, wherein the side wall is angled relative the open base between about 62° and 68°.

10. The oil separator assembly of claim 7, wherein the cavity further includes a reservoir positioned below the inlet diffuser for catching and collecting the coalesced oil directed transversely away from the gaseous flow by the directing means, the oil outlet port fluidly communicating with the reservoir for emitting the coalesced oil from the reservoir.

11. The oil separator assembly of claim 7, wherein the vessel includes two generally-vertical end members, and a tubular wall member extending between and connecting the two generally-vertical end members to form the cavity thereby; and
  further wherein the inlet pipe extends through the tubular wall member in a substantially horizontal orientation, and the inlet diffuser is secured to the vessel with the longitudinal slot positioned for discharging the gaseous flow substantially toward one of the two generally-vertical end members.

12. The oil separator assembly of claim 11, wherein the longitudinal slot is positioned for discharging the gaseous flow substantially toward one of the two generally-vertical end members at an angle above the horizontal between about 20° and 25°.

13. The oil separator assembly of claim 11 further comprising secondary oil separating means for separating additional oil still entrained in the gaseous flow after the gaseous flow is discharged from the inlet diffuser.

14. The oil separator assembly of claim 13, wherein the secondary oil separating means includes a coalescing member positioned between the longitudinal slot and said one of the two generally-vertical end members, the inlet diffuser being secured with the longitudinal slot positioned for discharging the gaseous flow substantially toward the coalescing member for separating additional oil still entrained in the gaseous flow.

15. An oil separator assembly for removing oil entrained in a compressed refrigerant gas circulating through a liquid chilling system, the oil separator comprising:
  a substantially enclosed vessel having a cavity formed therein;
  an inlet pipe for extending into the vessel and fluidly communicating with the cavity for injecting the compressed refrigerant gas and entrained oil into the cavity,
  an inlet diffuser aligned with the inlet pipe for initially separating the entrained oil from the compressed refrigerant gas as the compressed refrigerant gas and entrained oil pass through the inlet diffuser, the inlet diffuser including
    a hollow member having an open base for receiving the compressed refrigerant gas and entrained oil, a closed end longitudinally spaced from the open base, and a converging side wall longitudinally-extending from the open base to the closed end, said hollow member being configured so that the compressed refrigerant gas and entrained oil received through the open base gradually impact on an inner surface of the side wall in a manner sufficient to promote coalescence of the oil thereon to effectively separate the oil from the compressed refrigerant gas, the side wall having a longitudinal slot formed therethrough for discharging the compressed refrigerant gas after the compressed refrigerant gas impacts on the inner surface of the side wall and the oil is coalesced, and means for directing the coalesced oil transversely away from the compressed refrigerant gas to prevent re-entrainment of the coalesced oil as the compressed refrigerant gas is discharged through the longitudinal slot, the directing means including outwardly contoured lip members respectively formed along opposing longitudinal edges of the longitudinal slot in smooth transition with the inner surface of the side wall to permit the coalesced oil to move from the inner surface of the side wall onto the outwardly contoured lip members transversely away from the compressed refrigerant gas;

an oil outlet port communicating with the cavity and extending from the vessel for emitting the coalesced oil from the cavity; and a gas outlet port communicating with the cavity and extending from the vessel for exhausting the compressed refrigerant gas from the cavity substantially free of oil.

16. The oil separator assembly of claim 15, wherein said hollow member is substantially conical in shape.

17. The liquid chilling system of claim 15, wherein the vessel of the oil separator includes two generally-vertical end members, and a tubular wall member extending between and connecting the two generally-vertical end members to form the cavity thereby; and further wherein the inlet pipe extends through the tubular wall member in a substantially horizontal orientation, and the inlet diffuser is attached to the inlet pipe with the longitudinal slot positioned for discharging the refrigerant gas substantially toward one of the two generally-vertical end members at an angle above the horizontal between about 20° and 25°.

18. An inlet diffuser for separating a liquid entrained in a gaseous flow as the gaseous flow and entrained liquid pass through the inlet diffuser, the inlet diffuser comprising:

a hollow member substantially conical in shape having an open base for receiving the gaseous flow and entrained liquid, a closed end longitudinally spaced from the open base, and a converging side wall longitudinally-extending from the open base to the closed end, said hollow member being configured so that the gaseous flow and entrained liquid received through the open base gradually impact on an inner surface of the side wall in a manner sufficient to promote coalescence of the liquid thereon to effectively separate the liquid from the gaseous flow;

the side wall having a longitudinal slot formed therethrough for discharging the gaseous flow after the gaseous flow impacts on the inner surface of the side wall and the liquid is coalesced, the longitudinal slot having a substantially triangular shape with a base and an apex, the base of the triangular-shaped longitudinal slot being positioned proximate the open base of said hollow member and the apex of the triangular-shaped longitudinal slot being positioned proximate the closed end of said hollow member; and means for directing the coalesced liquid transversely away from the gaseous flow to prevent re-entrainment of the coalesced liquid as the gaseous flow is discharged through the longitudinal slot.

19. The inlet diffuser of claim 18, wherein the side wall is angled relative the open base between about 62° and 68°.

* * * * *

UNITED STATES PATENT AND TRADEMARK OFFICE
CERTIFICATE OF CORRECTION

PATENT NO. : 5,242,475
DATED : September 7, 1993
INVENTOR(S) : Robert L. Stine et al.

It is certified that error appears in the above-indentified patent and that said Letters Patent is hereby corrected as shown below:

Title page, item [75], delete in its entirety and insert therefore --Robert L. Stine, Red Lion, by Janet L. Stine, legal representative; Keith E. Starner, York, both of Pennsylvania.--

Signed and Sealed this

Nineteenth Day of April, 1994

Attest:

BRUCE LEHMAN

*Attesting Officer*     *Commissioner of Patents and Trademarks*